US006220615B1

(12) United States Patent
Chubbuck

(10) Patent No.: US 6,220,615 B1
(45) Date of Patent: Apr. 24, 2001

(54) AEROBIC WHEELCHAIR ATTACHMENT

(75) Inventor: Joseph Chubbuck, Rome, NY (US)

(73) Assignee: H. F. Brown Machine Co., Inc., Utica, NY (US)

( * ) Notice: Subject to any disclaimer, the term of this patent is extended or adjusted under 35 U.S.C. 154(b) by 0 days.

(21) Appl. No.: 09/146,780

(22) Filed: Sep. 4, 1998

(51) Int. Cl.[7] .................................................. B62M 1/02
(52) U.S. Cl. .................................. 280/304.1; 280/255
(58) Field of Search .......................... 280/304.1, 288.4, 280/250.1, 255, 256; 297/DIG. 4, 217.1, 423.26; 482/60, 80, 92; 188/2 F

(56) References Cited

U.S. PATENT DOCUMENTS

| | | | | |
|---|---|---|---|---|
| 295,150 | * | 3/1884 | Crowley | 280/255 |
| 849,342 | * | 4/1907 | Swinbank | 280/255 |
| 1,688,024 | | 10/1928 | Scholer | 280/255 |
| 1,763,250 | | 6/1930 | Nettles | 280/256 |
| 2,368,142 | * | 1/1945 | Kelley | 280/250.1 |
| 3,423,086 | * | 1/1969 | Moore | 280/304.1 |
| 3,430,982 | | 3/1969 | Despain et al. | 280/255 |
| 4,077,648 | | 3/1978 | Seul | 280/236 |
| 4,351,406 | | 9/1982 | Lay | 180/65.1 |
| 4,421,336 | * | 12/1983 | Petrofsky et al. | 280/250.1 |
| 4,523,769 | | 6/1985 | Glaser et al. | 280/252 |
| 4,733,755 | * | 3/1988 | Manning | 188/2 F |
| 4,762,332 | * | 8/1988 | Seol | 280/250.1 |
| 4,766,772 | | 8/1988 | Tsuchie | 74/126 |
| 4,993,732 | | 2/1991 | Wedemeyer | 280/250.1 |
| 5,273,304 | | 12/1993 | Berkheimer | 280/304.1 |
| 5,280,937 | | 1/1994 | Needham | 280/259 |
| 5,324,060 | | 6/1994 | Van Vooren et al. | 280/304.1 |
| 5,335,927 | * | 8/1994 | Islas | 280/255 |
| 5,501,476 | | 3/1996 | Howell et al. | 280/230 |
| 5,501,480 | * | 3/1996 | Ordelman et al. | 280/250.1 |
| 5,522,644 | * | 6/1996 | Peek | 297/423.26 |
| 5,709,631 | | 1/1998 | Kleinsasser | 482/51 |

FOREIGN PATENT DOCUMENTS

| | | | | |
|---|---|---|---|---|
| 3824449 | * | 1/1990 | (DE) | 280/250.1 |
| 2553650 | * | 4/1985 | (FR) | 297/423.26 |
| 324577 | * | 1/1930 | (GB) | 280/255 |
| 325795 | * | 4/1935 | (IT) | 280/255 |

OTHER PUBLICATIONS

The Torrington Company, "Drawn Cup Roller Clutches", catalog RC–8, pp. 2–3, 1976.*

* cited by examiner

*Primary Examiner*—J. J. Swann
*Assistant Examiner*—Frank Vanaman
(74) *Attorney, Agent, or Firm*—Wall Marjama & Bilinski

(57) ABSTRACT

A therapeutic wheelchair that includes an auxiliary frame attached to the main frame of the wheelchair. An auxiliary drive wheel is mounted in the auxiliary frame and is coupled through a drive linkage to a pair of leg operated levers whereby the auxiliary drive wheel is rotated as the levers are moved up and down to propel the wheelchair. A lifting mechanism is provided for raising the auxiliary drive wheel so that the wheel can be driven through the levers without propelling the wheelchair to provide therapy to a person confined to the chair or alternatively, allowing the chair to be used in a conventional manner.

19 Claims, 3 Drawing Sheets

AEROBIC WHEELCHAIR ATTACHMENT

BACKGROUND OF THE INVENTION

This invention relates to a wheelchair that provides the user with the ability to exercise therapeutically his or her legs and hips while sitting in place or propelling the chair. More specifically, the present invention involves a wheelchair attachment that offers the capability of exercising the lower body to a large number of disabled or handicapped individuals.

Often time when people are unable to walk due to post-operative recoveries, injuries or the like, their unused muscles become weakened and the body loses strength. Typically, when a recovery is lengthy or not possible, the individuals must attend therapy on a regular basis. This type of therapy is not only time consuming, but expensive in that the patient usually must be transported from a place of confinement to the therapist's office. This, in turn, can result in missed appointments due to bad weather, help shortages, lack of transportation and the like. Under these types of adverse conditions, a patient can soon lose a desire to continue in therapy.

A manually propelled wheelchair is disclosed in U.S. Pat. No. 4,993,732 wherein a patient seated in the chair can manually drive the wheels through means of a pair of hand-operated levers. The levers are hand pumped back and forth and the motion translated to the main drive wheels of the chair through a suitable linkage to cause the wheels to rotate in a forward direction. Although this device exercises the patient's upper body, it does not therapeutically aid the lower part of the body which, in many cases, is the part of the body that most needs exercise.

U.S. Pat. No. 5,273,304 discloses a leg powered attachment for a conventional wheelchair. A single drive wheel unit equipped with pedals is simply connected to the wheelchair frame by a pipe. The person seated in the chair then pedals the drive wheel much like a child's tricycle. The pedals are directly coupled to the drive wheels and, as anyone who has ridden a tricycle knows, pedaling can tire the operator rapidly. In the case of a disabled or handicapped person, pedaling the wheelchair using this type of system could be overtaxing and self-defeating. A similar drive system is disclosed in a later U.S. Pat. No, 5,280,937 where the direct pedal drive is replaced by a combination sprocket and chain drive unit which offers some improvement. This device, however, requires the chair casters to be removed and replaced by the auxiliary drive unit, thus preventing the chair from being used in a conventional manner.

A wheelchair is disclosed in U.S. Pat. No. 5,324,060 which is again quite similar to that described in the above noted '937 patent. Here again, a frame is attached to a wheelchair and contains a drive wheel coupled to a pair of foot peddles by a conventional bicycle sprocket and chain arrangement. Like many of the similar prior art devices, this combination wheelchair and bicycle can overtax a disabled person and negates the ability to use the chair in a conventional manner.

SUMMARY OF THE INVENTION

It is, therefore, a primary object of the present invention to improve wheelchairs.

A further object of the present invention is to provide a conventional wheelchair with a therapeutic/aerobic attachment that is designed to strengthen or rehabilitate a person's lower body.

A still further object of his present invention is to provide an attachment for a wheelchair that will permit a person seated in the chair to propel the chair using his or her legs or alternatively perform therapeutic/aerobic exercises while the chair remains in place.

Another object of the present invention is to convert a conventional wheelchair into a low stress, low impact piece of equipment that has therapeutic value to the one confined to a wheelchair.

Yet another object of the present invention is to improve the quality of life to a person confined to a wheelchair.

These and other objects of the present invention are attained by a therapeutic/aerobic attachment for a wheelchair having a main frame for supporting a seat and wheels of conventional design. An auxiliary frame is attachable to the main frame that has an auxiliary drive wheel rotatably mounted therein. A pair of leg operated lever arms are connected to the drive wheel through a linkage mechanism and a one way clutch bearing so that the auxiliary drive wheel will propel the chair forwardly when the lever arms are moved up and down. The lever arms are interconnected by a transmission that coordinates the motion of the lever arms so that one arm moves upwardly while the other moves downwardly.

The auxiliary frame is further equipped with a lifting mechanism that is operable by a person seated in the wheelchair to raise the drive wheel above the support surface upon which the chair is resting. The chair thus can be used in a conventional manner or alteratively, the lever arm can be operated to provide a therapeutic workout without moving the wheelchair.

BRIEF DESCRIPTION OF THE DRAWINGS

For a better understanding of these and other objects of the present invention, reference will be made to the following detailed description of the invention which is to read in association with the accompanying drawings, wherein.

DESCRIPTION OF THE INVENTION

Figure 1:
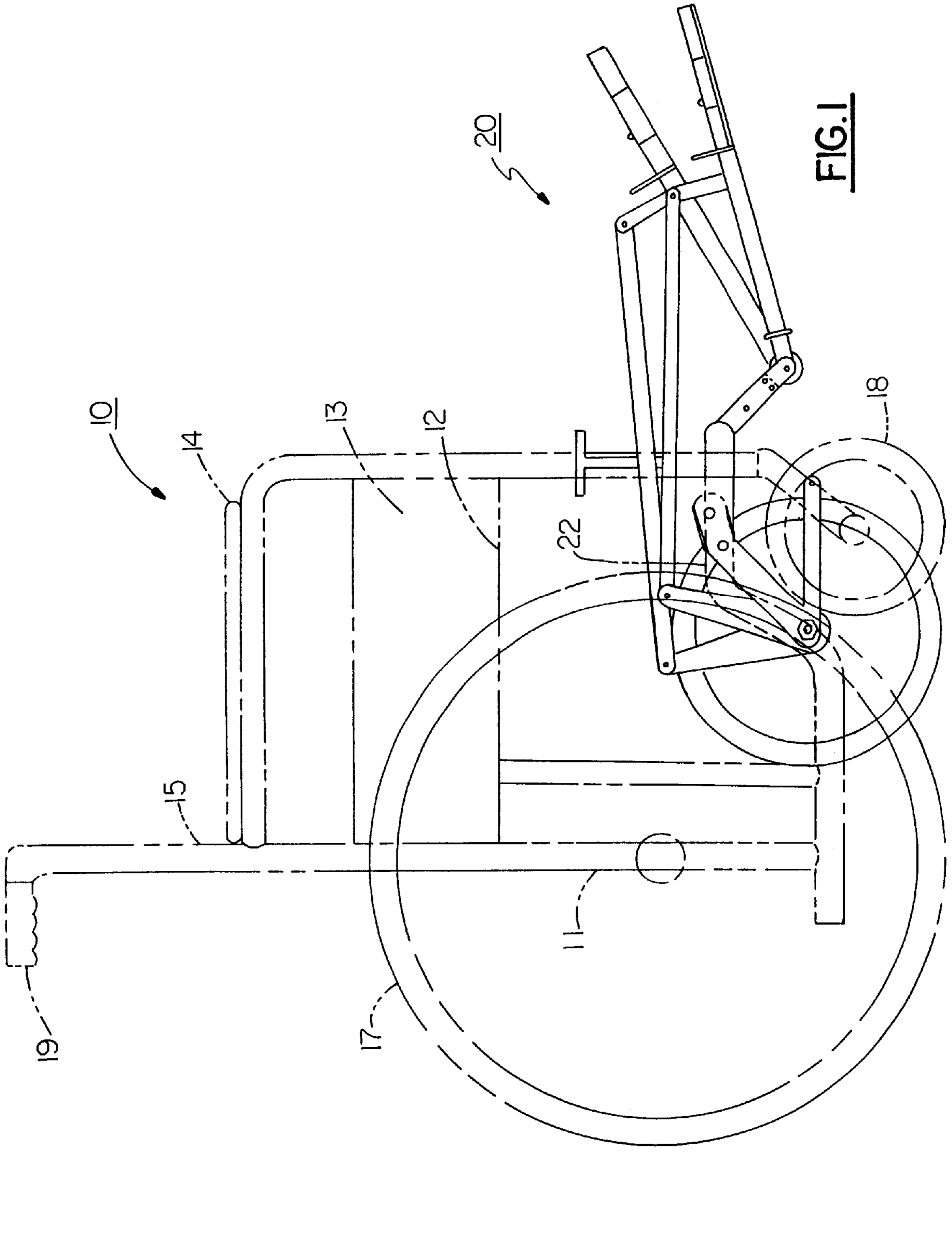
FIG. 1 is a side elevation of a wheelchair that is equipped with a therapeutic attachment that embodies the teachings of the present invention.

Referring initially to FIG. 1, there is shown in phantom outline a conventional wheelchair which is generally referenced 10. The wheelchair is equipped with a tubular metal main frame 11 for supporting a seat 12 having side guards 13, arm rests 14, and a back rest 15. A pair of large manually operated main drive wheels 17 are rotatably mounted in the rear of the main frame by which a person seated in the chair can both propel and steer the device over a support surface. A pair of casters 18 are mounted in the front of the main frame which assists in maneuvering of the chair. Hand grips 19 are also provided at the top rear of the frame to aid a person standing behind the chair in pushing or steering the chair when such a need for assistance arises.

Figure 5:
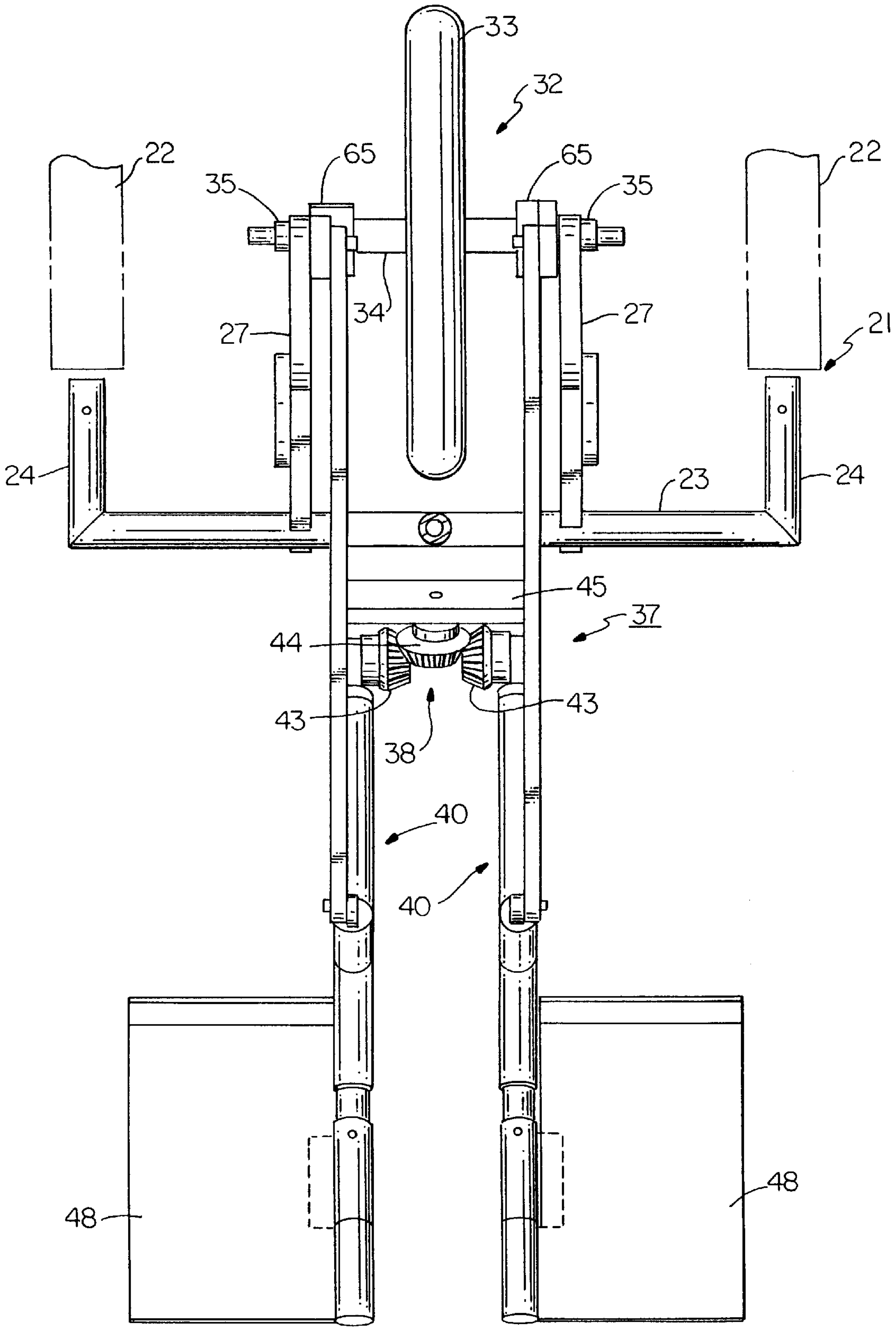
FIG. 5 is a top view of the therapeutic attachment shown in FIG. 2.

A therapeutic unit generally referenced 20 is attached to the front of the main frame of he wheelchair. The presently depicted unit is detachably connected to the frame, however, it should be evident from the disclosure below that the unit can be permanently attached to the main frame of the wheelchair without departing from the teachings of the present invention. The therapeutic unit contains an auxiliary frame 21 that attaches to the main frame of the wheelchair. The auxiliary frame as illustrated in FIG. 5 includes a cross member 23 and a pair of rearwardly extended arms 24. The arms are slidably received within hollow side members 22 (FIG. 5) located in the main frame of the wheelchair and held therein using detent pins (not shown).

Figures 2, 3, 4:
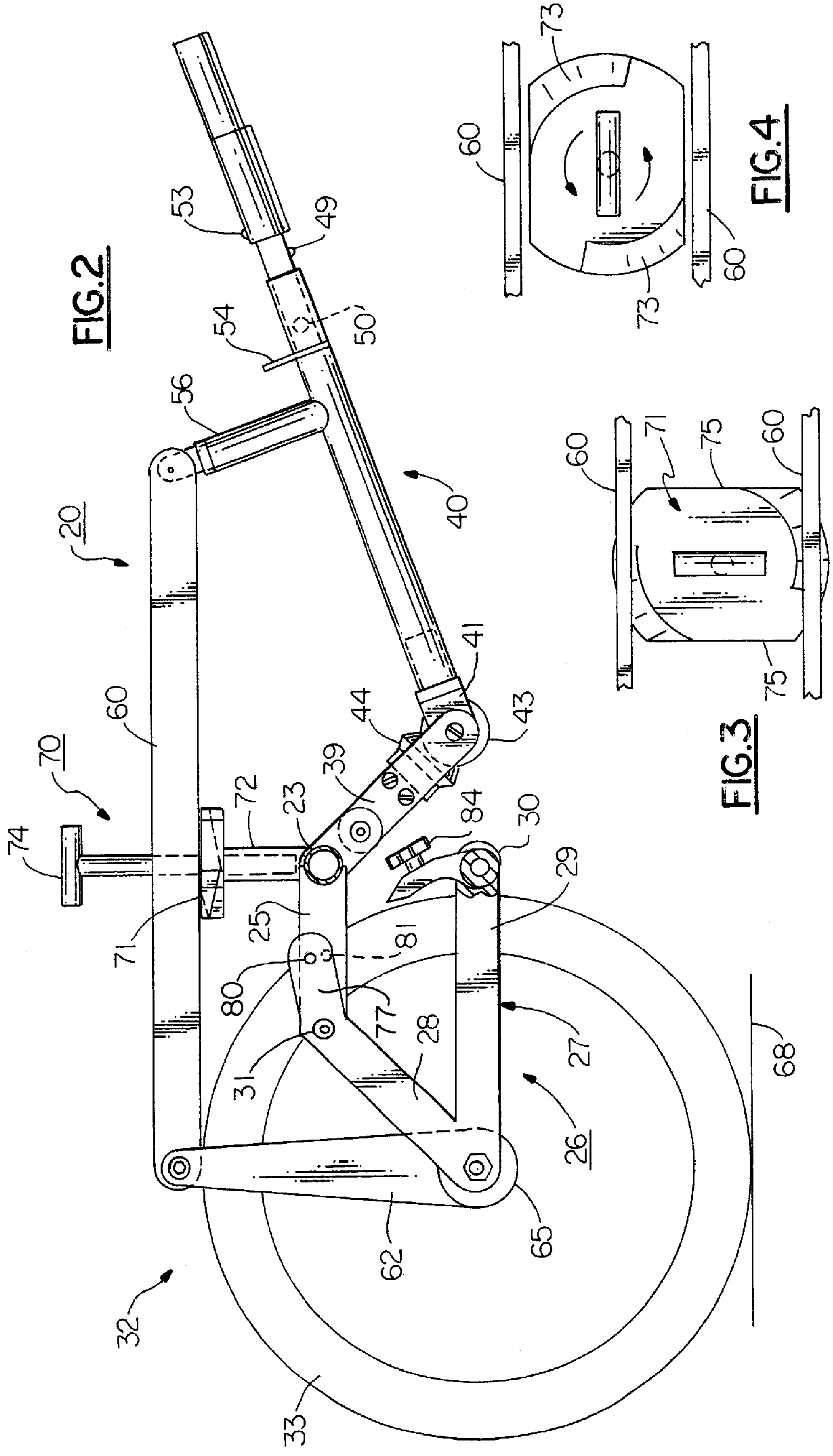
FIG. 2 is an enlarged side elevation of the therapeutic attachment shown in FIG. 1.
FIG. 3 is a partial top view showing part of the lifting mechanism of the therapeutic attachment in contact with the linkage for connecting the foot levers of the attachment with the auxiliary drive wheel.
FIG. 4 is a partial top view similar to that shown in FIG. 4 with the mechanism out of contact with the linkage.

With further reference to FIGS. 2–4, the therapeutic unit further includes a pair of spaced apart horizontally disposed support arms 25 that are welded to the cross bar of the frame. A fork 27 made up of an upper member 28 and a lower member 29 is pivotably mounted in the back of each support arm by means of a pivot pin 31 located at the distal end of the upper member of each fork. The distal ends of the lower fork members are cojoined by means of a stabilizer rod 30 so that they can rotate together about the two stationary support arms. Accordingly, the two cojoined forks combine to create a swing unit herein referenced 26.

A wheel assembly, generally referenced 32, is rotatably suspended between the two forks 27. The wheel assembly contains an auxiliary drive wheel 33 that is secured upon an axle 34 (FIG. 5). The axle, in turn, is rotatably mounted in bearings 35 located at the apex of each V-shaped fork. The entire wheel assembly can thus swings with the forks as they are rotated upon the support arms to raise or lower the auxiliary drive wheel.

A transmission 37 containing a bevel gear train 38 is mounted between a pair of spaced-apart beams 39 that are welded to the cross bar of the auxiliary frame so that the beams extend forwardly and downwardly from the cross bar at an acute angle. A pair of moveable foot levers 40 are rotatably supported in the distal ends of the beams in suitable bearing blocks 41 so that the levers can move freely in a generally up and down motion. A bevel gear 43 is secured to the proximal end of each foot lever for movement therewith. The two gears are coupled together by an idler gear 44 rotatably mounted in a gear plate 45 that is secured between the two beams 39. The motion of the two foot levers is coordinated through the gear train so that one lever moves in an upwardly direction while the other is moving in a downwardly direction.

A leg rest 48 is mounted at the proximal end of each lever arm. A tubular connector 49 is telescoped into the proximal end of each lever and is slidably positionable to adjust the length of the lever using a spring ball detent 50 which mates with suitable holes along the length of the associated lever. Each foot rest is equipped with a cylindrical housing 51 that is slidably received upon the tubular connector. Again, the foot rest is held in the desired set position by means of a spring ball detent 53 that mates with circumferentially spaced holes in the housing. A heel rest 54 is mounted at the distal end of each leg rest which provides further support to the foot and leg of a person seated in the chair.

An upwardly extended fixed link 56 is welded or otherwise secured to each lever and is pivotably secured in one end of an elongated connecting bar 60. The opposite end of each connecting bar is rotatably coupled to a generally vertically disposed moveable drive arm 62. The drive arm, in turn, is connected to the axle of the auxiliary drive wheel assembly via a unidirectional clutch bearing 65. The clutch bearing, the drive arm 62 and the connecting bar 60 combine to convert the up and down motion of the leg levers 40 into a rotational motion at the wheel axle 34. The unidirectional clutch bearing engages the axle when rotated in a first direction to turn the auxiliary drive wheel in a direction to propel the chair in a forward direction and to release the axle when rotated in the opposite direction.

A lifting mechanism generally referenced 70, which is operable by one seated in the wheel chair, is provided to raise the auxiliary drive wheel 33 out of contact with the support surface 68. The lifting mechanism includes a lock lever disc 71 rotatably supported in a stanchion 72 located beneath the lever arms. The lock lever disc has twin cams 73 formed on its upper surface as illustrated in FIGS. 3 and 4. The lock lever disc further contains a pair of opposed flat surfaces 75 that permit the levers to move up and down past the disc when the disc is placed in an inoperative position as shown in FIG. 4. Turning the disc about 130° brings the camming surfaces in contact with the bottom of the levers. Further rotation of the disc brings the lever arms to the same height as shown in FIG. 2 and causes the wheel to be lifted from the support surface 68. A raised handle 74 is mounted upon the disc in axial alignment therewith which is easily reachable by a person seated in the chair, thus enabling the person to turn the disc between the inoperative position shown in FIG. 4 and the operative position shown in FIG. 5.

Once the wheel 33 is raised from the support surface, the stabilizer rod 30 can be pushed downwardly to about a 45° position rotating the entire swing arm unit further elevating the auxiliary drive wheel. A plate 77 is arranged to move with the upper member 28 of each fork 27. The outer end of each plate contains a hole 80 that passes therethrough which can be aligned with a companion hole 81 in each of the support bars 25. When aligned, a pin (not shown) is passed into the holes to support the swing arm unit, and thus, the auxiliary drive wheel, at the elevated position. With the pin inserted, the lock lever disc can be moved to the inoperative position to free the levers. The lever thereby can now be operated to rotate the elevated auxiliary drive wheel without propelling the wheelchair providing a stationary therapeutic exercise to a person seated in the chair. An adjustable friction bar 84 is mounted on the stabilizer rod which can be moved into contact with the elevated wheel to apply a desired load to the wheel, whereby a patient can exercise at various levels.

Alternatively, the levers can be supported by the lock lever disc in a raised position as illustrated in FIG. 5 and the wheelchair used in a conventional manner.

As should be evident from the disclosure above, the therapeutic device of the present invention provides the wheelchair three separate modes of operation. The first mode of operation enables the chair to be propelled by a pumping leg action of one seated in the chair when the auxiliary drive wheel is riding in contact with the surface upon which the wheelchair is resting. Accordingly, the user undergoes a therapeutic or rehabilitative lower body exercise while, at the same time, enabling the user to move about from place to place. The second mode of operation, wherein the auxiliary drive wheel is raised out of contact with the chair support surface and the lever arms are free to move up and down, the patent can exercise therapeutically without propelling the chair. The exercise can thus be performed in a relatively confined space such as a bedroom or the like. Lastly, with the auxiliary drive wheel raised and the lever arms resting on the cam surfaces as illustrated in FIG. 5, the wheelchair can be used in a conventional manner without the need of removing the auxiliary frame from the chair.

While this invention has been explained with reference to the structure disclosed herein, it is not confined to the details set forth and this invention is intended to cover any modifications and changes as may come within the scope of the following claims:

What is claimed:

1. A therapeutic/aerobic wheelchair that includes a main chair frame for supporting a seat and chair wheels whereby the chair can be propelled over a supporting surface, an auxiliary frame attached to said main frame, an auxiliary drive wheel rotatably mounted in said auxiliary frame upon an axle beneath said seat of the main frame, a pair of leg operated levers that are pivotally mounted in said auxiliary frame, and extend forward of said seat of the main frame, a linkage for operatively connecting each of said levers to said auxiliary drive wheel through a uni-directional clutch bearing, said linkage and clutch bearing coacting to transmit a rotating motion through said axle to the drive wheel as the levers are alternately moved in an upward and a downward direction to propel the wheelchair in a forward direction, a transmission means for coordinating the motion of the levers so that one lever moves in an upward direction while the other lever moves in a downward direction and lifting means for raising said auxiliary drive wheel out of contact with said supporting surface wherein said lifting means further includes a pair of spaced-part fork members for supporting the auxiliary drive wheel in the auxiliary frame, said fork members being rotatably supported by a pair of spaced-part stationary support bars connected to the auxiliary frame wherein the forks are rotatable between a first position and the auxiliary drive wheel is in contact with said supporting surface and a second position wherein said auxiliary drive wheel is out of contact with said supporting surface.

2. The wheelchair of claim 1 wherein said linkage further includes a pair of elongated connecting arms, each connecting arm being attached at one end to one of said leg operated levers and at the other end to a vertically disposed drive arm coupled to the unidirectional clutch bearing.

3. The wheelchair of claim 2 wherein said lifting means further includes a lock lever disc having camming surfaces that are operable for engaging said connecting arms and lifting said arms vertically whereby the auxiliary wheel is raised from the supporting surface.

4. The wheelchair of claim 3 wherein said lock lever disc has twin camming surfaces on a top surface that are arranged to move into contact with a bottom surface on each connecting arm when said lock lever disc is turned from a first inoperative position wherein the disc is out of contact with the connecting arms and said arms can move freely past said disc, and a second operative position wherein said camming surfaces are in engagement with the connecting arms, and a handle for turning said disc between said first and second positions.

5. The wheelchair of claim 4 wherein said lock lever disc is mounted in a stanchion up on the auxiliary frame at an elevation such that the connecting arms are supported at about the same elevation when the disc is in said second operative position.

6. The wheelchair of claim 4 that further includes a locking means for locking the fork members to the support bars when the auxiliary wheel is at an elevated position above the support surface whereby said disc can be moved to said first position and the leg operated levers can move up and down to rotate the elevated auxiliary drive wheel.

7. The wheelchair of claim 6 that further includes an adjustable brake means acting upon the auxiliary drive wheel whereby the resistance of the drive wheel to the levers can be selectively regulated.

8. The wheelchair of claim 1 wherein said transmission means includes a bevel gear mounted at a proximal end of each leg operated lever and an idler gear mounted in the auxiliary frame for coupling the bevel gears.

9. The wheelchair of claim 1 that further includes attaching means for detachably securing the auxiliary frame to the main frame.

10. The Wheelchair of claim 1 wherein said leg operated levers each includes a leg rest mounted at a distal end thereof.

11. The wheelchair, of claim 10 having means for axially adjusting the length of each lever.

12. The wheelchair of claim 10 having further means for rotatably adjusting each leg rest.

13. A wheelchair that includes a main chair frame for supporting a seat and chair wheels whereby the wheelchair can be propelled over a support surface, an auxiliary frame attached to said main frame, an auxiliary drive wheel mounted upon an axle within said auxiliary frame so that said auxiliary drive wheel rides in contact with said support surface, a pair of brake clutches, one each mounted on said axle on either side of said auxiliary drive wheel, a pair of elongated leg operated lever arms movably mounted by coaxially aligned pivots in said auxiliary frame, said lever arms extending forward of said seat and being arranged to reciprocate up and down about said pivots, each lever arm being connected to one of said brake clutches so that the brake clutch engages the axle when the lever arm is moved in a downward direction to rotate the drive wheel and to release the axle when the lever arm is moved in an upward direction, and gear means for connecting said lever arm to coordinate the motion of said lever arms so that one arm moves in an upward direction when the other arm is moving in a downward direction.

14. The wheelchair of claim 13 wherein said gear means includes a bevel gear connected to each of said lever arms for rotation about the axis of said pivots and an idler gear mated to each of said bevel gears.

15. The wheelchair of claim 13 wherein said auxiliary drive wheel is positioned under the seat of said wheelchair.

16. The wheelchair of claim 13 wherein said auxiliary frame is removably connected to said main frame.

17. The wheelchair of claim 13 that further includes adjusting means for adjusting the length of each lever arm.

18. The wheelchair of claim 13 that further includes a bar linkage for connecting each of said lever arms to one of said brake clutches.

19. The wheelchair of claim 13 that further includes a lifting means mounted in said auxiliary frame for raising said auxiliary drive wheel out of contact with said support surface.

* * * * *